US009606302B2

United States Patent
Ott et al.

(10) Patent No.: US 9,606,302 B2
(45) Date of Patent: Mar. 28, 2017

(54) FERRULES FOR FIBER OPTIC CONNECTORS

(71) Applicants: Michael James Ott, Hudson, WI (US); Yu Lu, Eden Prairie, MN (US)

(72) Inventors: Michael James Ott, Hudson, WI (US); Yu Lu, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/776,911

(22) PCT Filed: Mar. 13, 2014

(86) PCT No.: PCT/US2014/025735
§ 371 (c)(1),
(2) Date: Sep. 15, 2015

(87) PCT Pub. No.: WO2014/151443
PCT Pub. Date: Sep. 25, 2014

(65) Prior Publication Data
US 2016/0025940 A1    Jan. 28, 2016

Related U.S. Application Data

(60) Provisional application No. 61/787,839, filed on Mar. 15, 2013.

(51) Int. Cl.
G02B 6/38 (2006.01)
G06N 3/063 (2006.01)
G06N 3/08 (2006.01)

(52) U.S. Cl.
CPC .......... *G02B 6/3863* (2013.01); *G02B 6/381* (2013.01); *G06N 3/0635* (2013.01); *G06N 3/08* (2013.01)

(58) Field of Classification Search
None
See application file for complete search history.

(56) References Cited

U.S. PATENT DOCUMENTS

| 5,212,742 | A  | 5/1993  | Normile et al.  |
| 5,317,663 | A  | 5/1994  | Beard et al.    |
| 5,333,223 | A  | 7/1994  | Schofield et al.|
| 5,781,674 | A  | 7/1998  | Asai            |
| 6,629,782 | B2 | 10/2003 | McPhee et al.   |
| 6,918,816 | B2 | 7/2005  | Bianchi         |
| 8,636,425 | B2 | 1/2014  | Nhep            |

(Continued)

FOREIGN PATENT DOCUMENTS

JP    02-077705    3/1990

OTHER PUBLICATIONS

International Search Report for International Application No. PCT/US2014/025735 mailed Jun. 11, 2014 (2 pages).

*Primary Examiner* — Sung Pak
(74) *Attorney, Agent, or Firm* — Merchant & Gould P.C.

(57) ABSTRACT

A ferrule for a fiber optic connector includes: a main body extending from a first end to a second end, the main body defining a bore extending from the first end to the second end; an end surface at the second end of the main body; and a raised portion on the end surface, the raised portion extending from the second end and surrounding the bore; wherein an optical fiber is configured to be positioned within the bore of the main body; and wherein the end surface is configured to be polished to remove the raised portion.

20 Claims, 9 Drawing Sheets

(56) References Cited

U.S. PATENT DOCUMENTS

2003/0215191 A1\* 11/2003 Taira ................... G02B 6/3821
       385/78
2004/0101254 A1    5/2004  Erdman et al.
2006/0008212 A1    1/2006  Wada et al.

\* cited by examiner

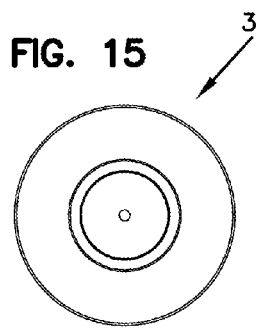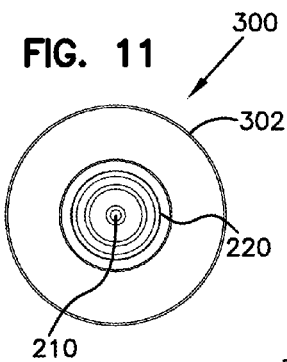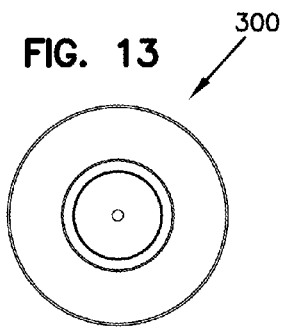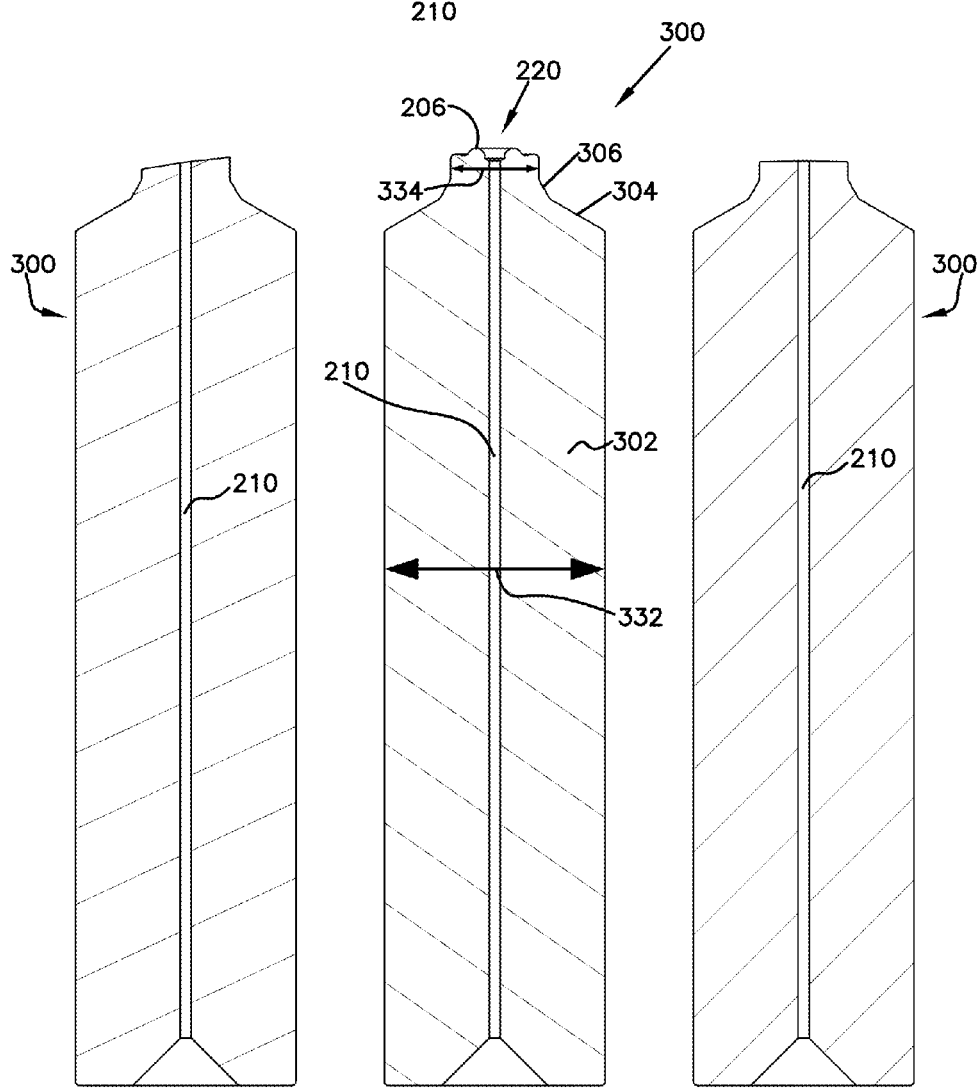

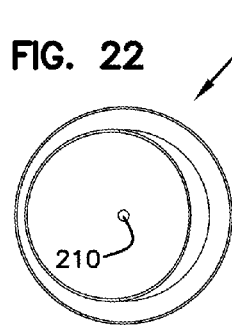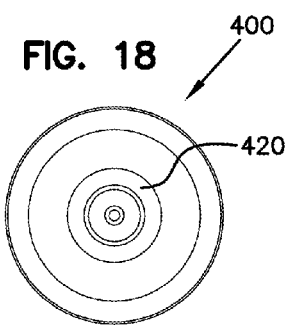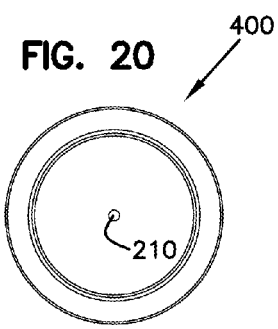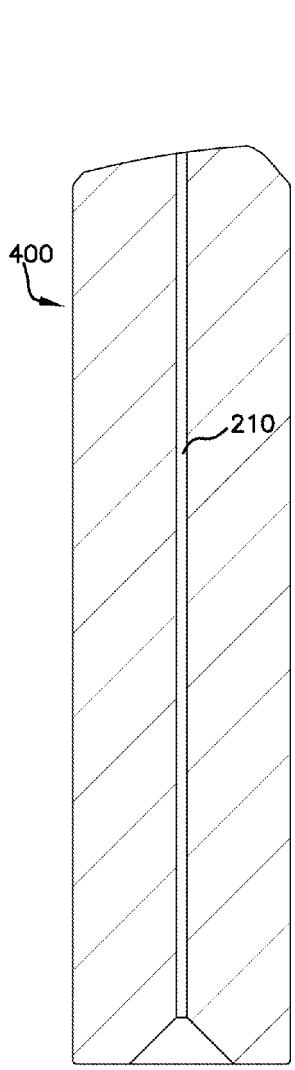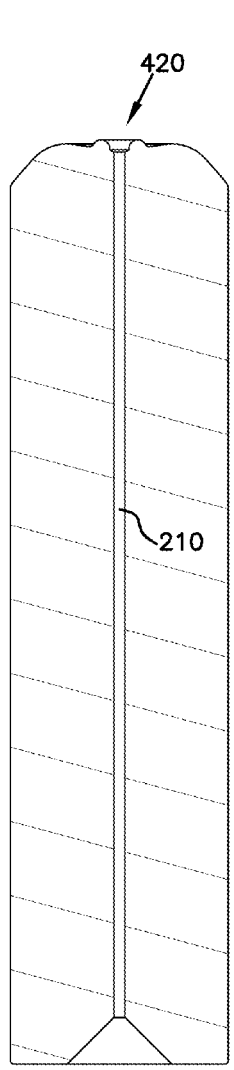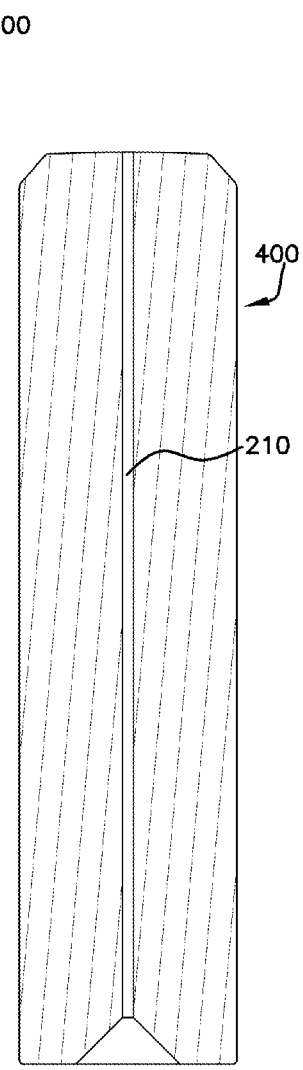

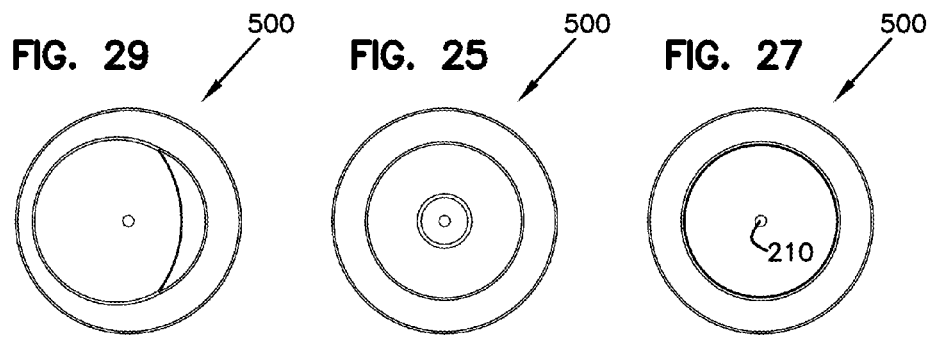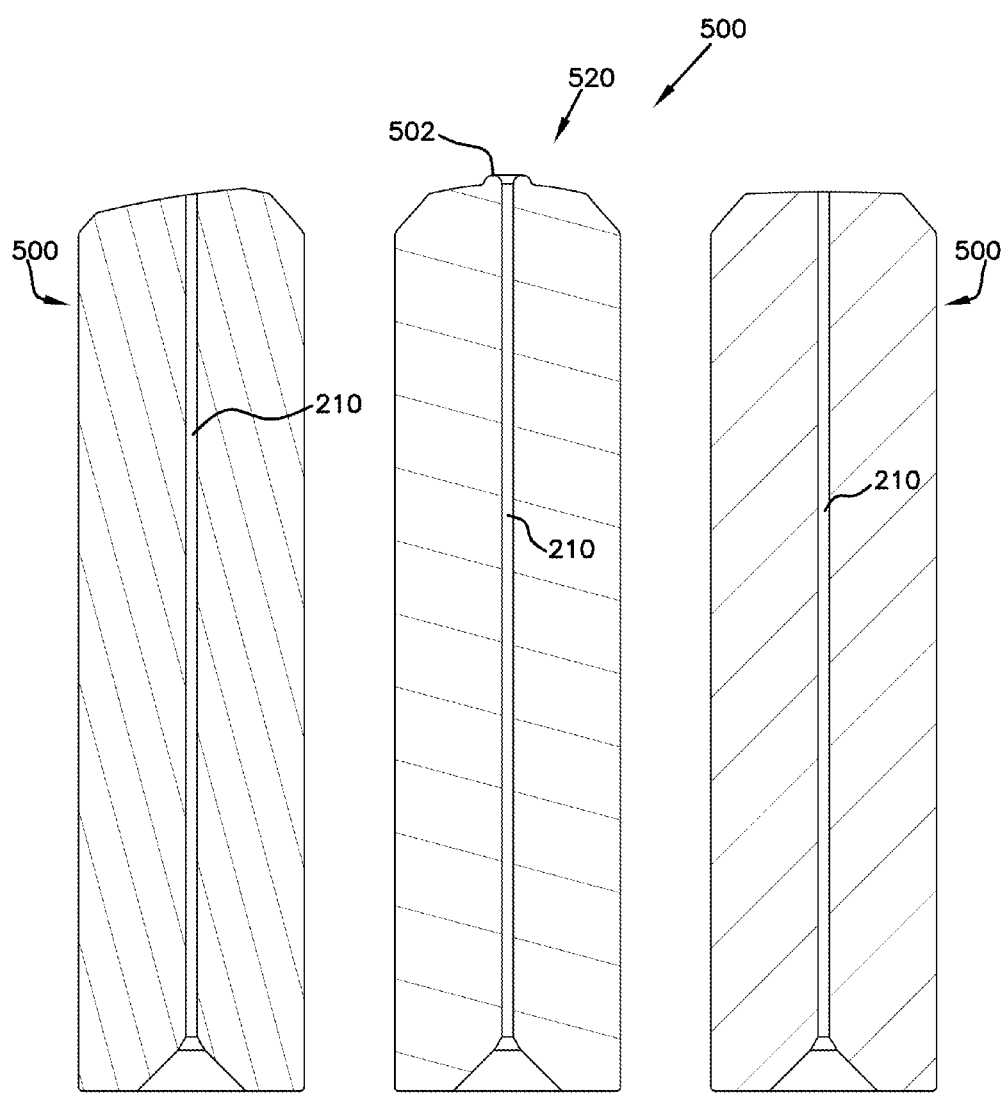

FERRULES FOR FIBER OPTIC CONNECTORS

CROSS-REFERENCE TO RELATED APPLICATION(S)

This application is a National Stage of PCT International Patent application no. PCT/US2014/025735, filed 15 Mar. 2013 and claims benefit of U.S. Patent Application Ser. No. 61/787,839 filed on 15 Mar. 2013, the and which applications are incorporated herein by reference. To the extent appropriate, a claim of priority is made to each of the above disclosed applications.

BACKGROUND

Fiber optic cables are used in the telecommunication industry to transmit light signals in high-speed data and communication systems. A standard fiber optic cable includes a fiber with an inner light transmitting optical core. Surrounding the fiber is an outer protective casing.

A fiber terminates at a fiber optic connector. Connectors are frequently used to non-permanently connect and disconnect optical elements in a fiber optic transmission system. There are many different fiber optic connector types. Some of the more common connectors are LC, FC, and SC connectors. Other types of connectors include LX.5, ST, and D4-type connectors.

A typical fiber optic connector, such as an SC connector, includes a housing having a front end positioned opposite from a rear end. The front end of the connector housing is commonly configured to be inserted within an adapter. An example adapter is shown in U.S. Pat. No. 5,317,663, assigned to ADC Telecommunications, Inc. The connector typically further includes a ferrule that is positioned within the front and rear ends of the housing, and adjacent the front end. The ferrule is axially moveable relative to the housing, and is spring biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers.

SUMMARY

In one aspect, a ferrule for a fiber optic connector includes: a main body extending from a first end to a second end, the main body defining a bore extending from the first end to the second end; an end surface at the second end of the main body; and a raised portion on the end surface, the raised portion extending from the second end and surrounding the bore; wherein an optical fiber is configured to be positioned within the bore of the main body; and wherein the end surface is configured to be polished to remove the raised portion.

In another aspect, a fiber optic connector includes: a connector body; and a ferrule positioned with in the connector body, the ferrule including: a main body extending from a first end to a second end, the main body defining a bore extending from the first end to the second end; an end surface at the second end of the main body; and a raised portion on the end surface, the raised portion extending from the second end and surrounding the bore; wherein an optical fiber is configured to be positioned within the bore of the main body; and wherein the end surface is configured to be polished to remove the raised portion.

In yet another aspect, a method for creating a fiber optic connector includes: providing a ferrule having a main body extending from a first end to a second end, the main body defining a bore extending from the first end to the second end; creating a raised portion on an end surface of the second end of the main body, the raised portion extending from the second end and surrounding the bore; positioning an optical fiber within the bore of the main body; and polishing the end surface to remove the raised portion.

DESCRIPTION OF THE DRAWINGS

FIG. 5 is an end view of the ferrule of FIG. 2.
FIG. 6 is a cross-sectional view of the ferrule of FIG. 2 after polishing.
FIG. 7 is an end view of the ferrule of FIG. 6.
FIG. 8 is another cross-sectional view of the ferrule of FIG. 2 after polishing.
FIG. 9 is an end view of the ferrule of FIG. 8.
FIG. 10 is a cross sectional view of another example ferrule of a fiber optic connector.
FIG. 11 is an end view of the ferrule of FIG. 10.
FIG. 12 is a cross-sectional view of the ferrule of FIG. 10 after polishing.
FIG. 13 is an end view of the ferrule of FIG. 12.
FIG. 14 is another cross-sectional view of the ferrule of FIG. 10 after polishing.
FIG. 15 is an end view of the ferrule of FIG. 14.
FIG. 16 is a cross sectional view of another example ferrule of a fiber optic connector.
FIG. 18 is an end view of the ferrule of FIG. 16.
FIG. 19 is a cross-sectional view of the ferrule of FIG. 16 after polishing.
FIG. 20 is an end view of the ferrule of FIG. 19.
FIG. 21 is another cross-sectional view of the ferrule of FIG. 16 after polishing.
FIG. 22 is an end view of the ferrule of FIG. 21.
FIG. 23 is a cross sectional view of another example ferrule of a fiber optic connector.
FIG. 25 is an end view of the ferrule of FIG. 23.
FIG. 26 is a cross-sectional view of the ferrule of FIG. 23 after polishing.
FIG. 27 is an end view of the ferrule of FIG. 26.
FIG. 28 is another cross-sectional view of the ferrule of FIG. 23 after polishing.
FIG. 29 is an end view of the ferrule of FIG. 28.

DETAILED DESCRIPTION

The present disclosure is directed towards fiber optic connectors. Although not so limited, an appreciation of the various aspects of the present disclosure will be gained through a discussion of the examples provided below.

Figure 1:
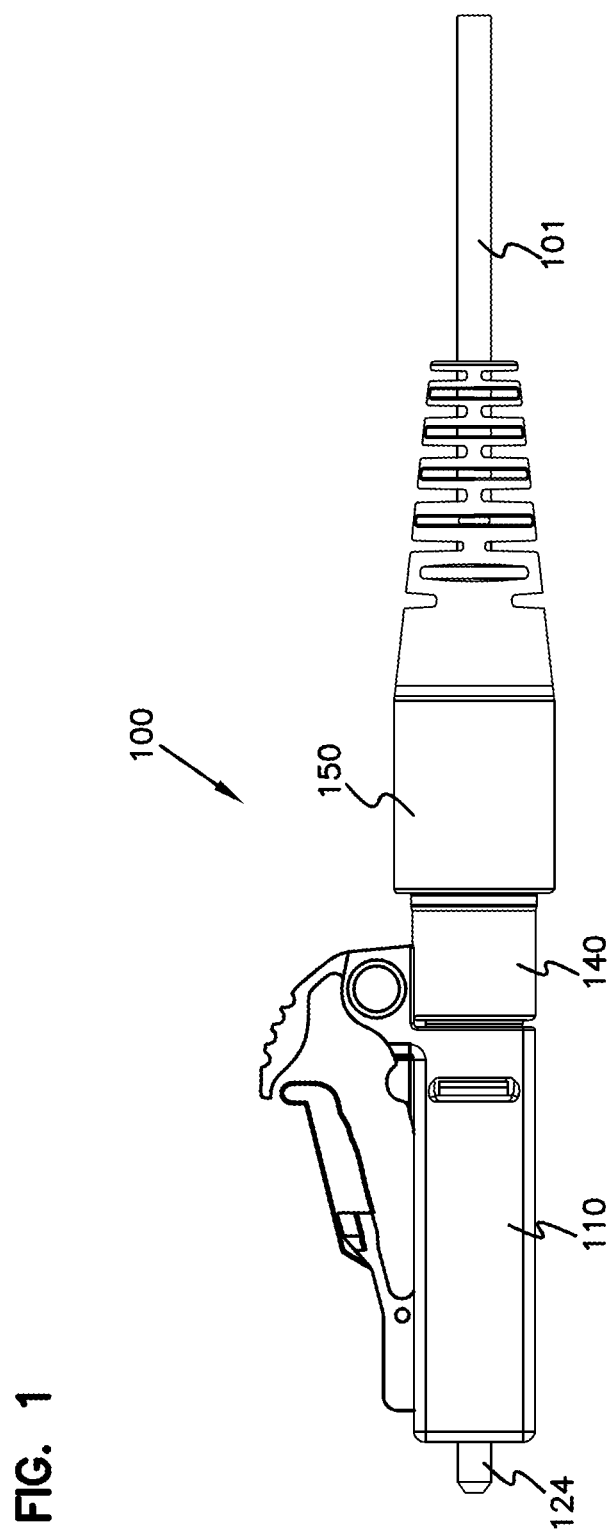
FIG. 1 is a side view of an example fiber optic connector.
Figure 2:
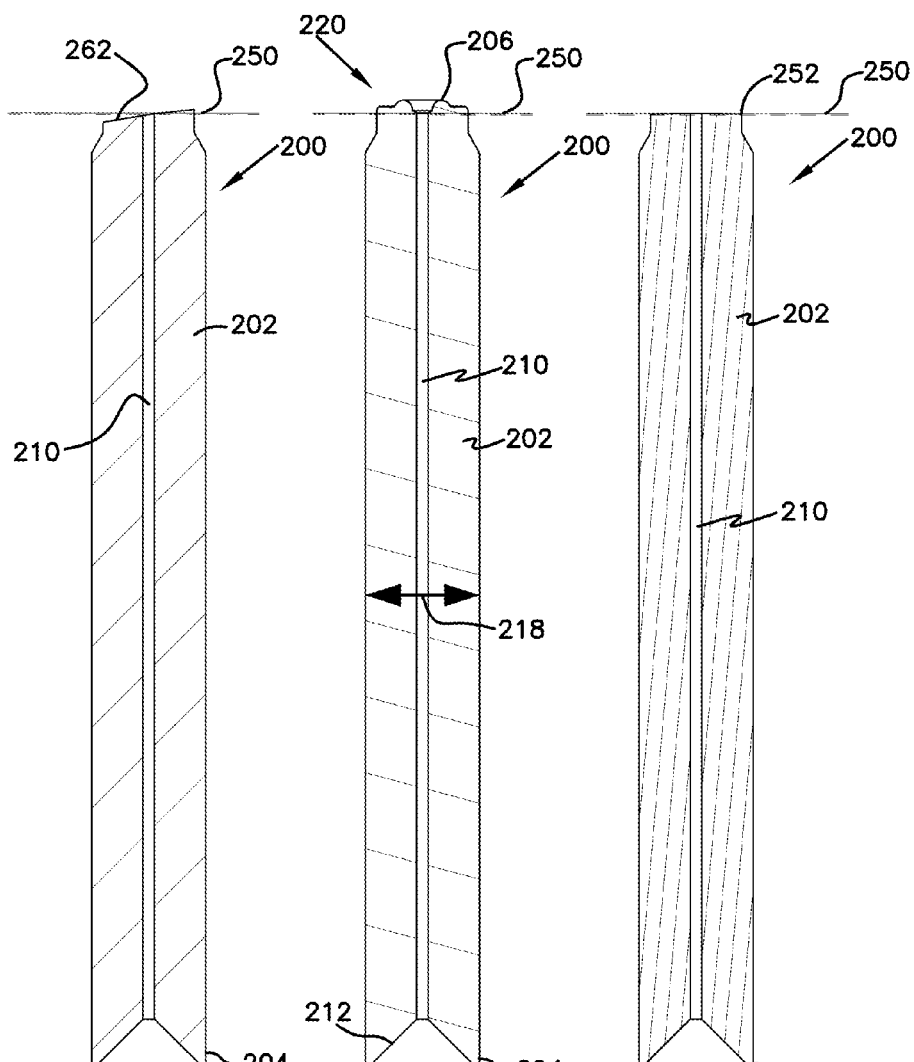
FIG. 2 is a cross sectional view of an example ferrule of a fiber optic connector.

FIG. 1 is side view of an example connector 100. In this example, the connector 100 is an LC connector, although other connector types can be used. The connector 100 includes a front housing 110, a rear housing 140, and a boot 150. Addition details regarding an LC connector configured in a similar manner are provided in U.S. patent application Ser. No. 13/420,286 filed on Mar. 14, 2012, the entirety of which is hereby incorporated by reference.

Also included in the connector 100 is a ferrule 124. An optical fiber (not shown) extends through a fiber optic cable 101 and is terminated within the ferrule 124. The ferrule 124 is biased into a forward position by a spring enclosed within the front and rear housings 110, 140. In use, the connector 100 is mated to an opposing connector using, for example, an adapter. When mated, the ferrule 124 engages the ferrule of the mating connector, and the ferrule 124 is pushed slightly backwards into the front housing 110. This allows the optical fiber to be mated with the optical fiber in the mating connector to create the connection.

In addition to moving axially, the ferrule 124 and associated optical fiber can be rotated in some example connectors. This rotation allows the connector 110 to be tuned. Details of example tuning processes can be found in U.S. Pat. Nos. 5,212,752 and 6,629,782, which are hereby incorporated by reference. Other methods of tuning can also be used.

Referring now to FIGS. 2-5, an example ferrule 200 is shown. The ferrule 200 is similar to the ferrule 124 described above, in that the ferrule 200 is configured to be used in a connector.

The ferrule 200 has a main body 202 that extends from a first end 204 to a second end 206. In use, the optical fiber 262 (see FIG. 4) is extended through a bore 210 running through an axis of the ferrule 200 from the first end 204 to the second end 206.

In this example, the first end 204 includes a tapered region 212 that allows the optical fiber 262 to more easily be introduced into the bore 210. The optical fiber 262 is fixed (e.g., with an epoxy 266—see FIG. 4) at a termination at the second end 206 of the ferrule 200.

After the optical fiber 262 is introduced into the ferrule 200, an end face 220 of the second end 206 of the ferrule is polished to modify the geometry of the second end 206 so that the connection with a mating ferrule is optimized. Different polishing techniques can be used to polish the end face 220. One such example is provided in U.S. Pat. No. 6,918,816, which is hereby incorporated by reference. Other configurations are possible.

Figure 3:
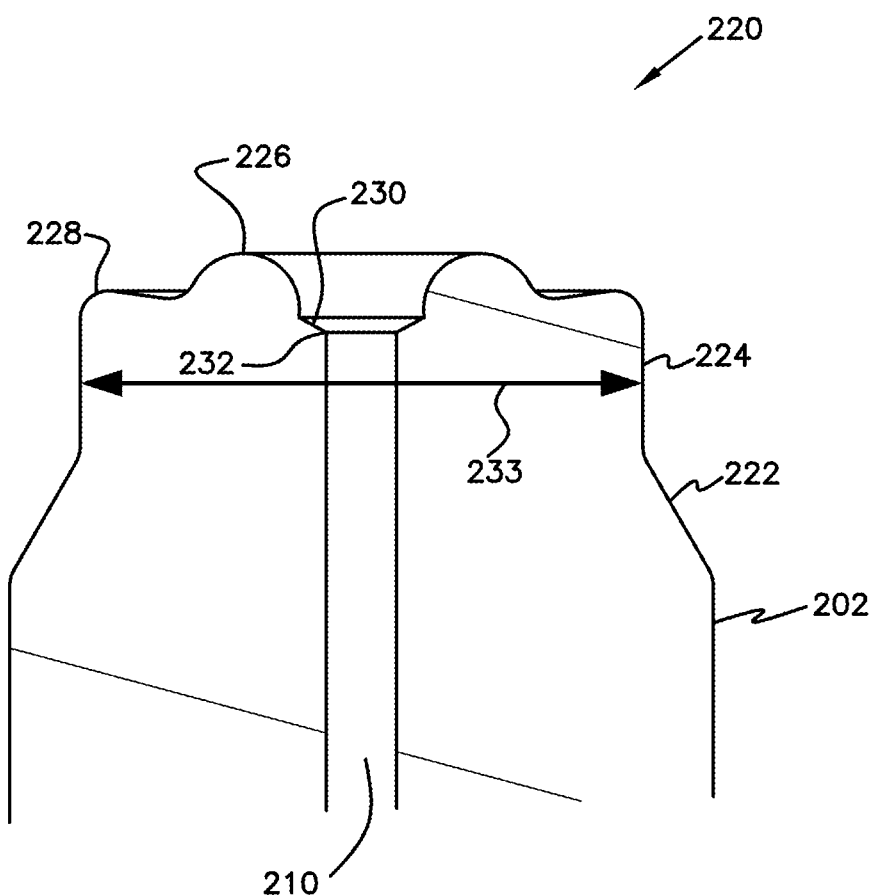
FIG. 3 is an enlarged view of a portion of the ferrule of FIG. 2.
Figure 4:
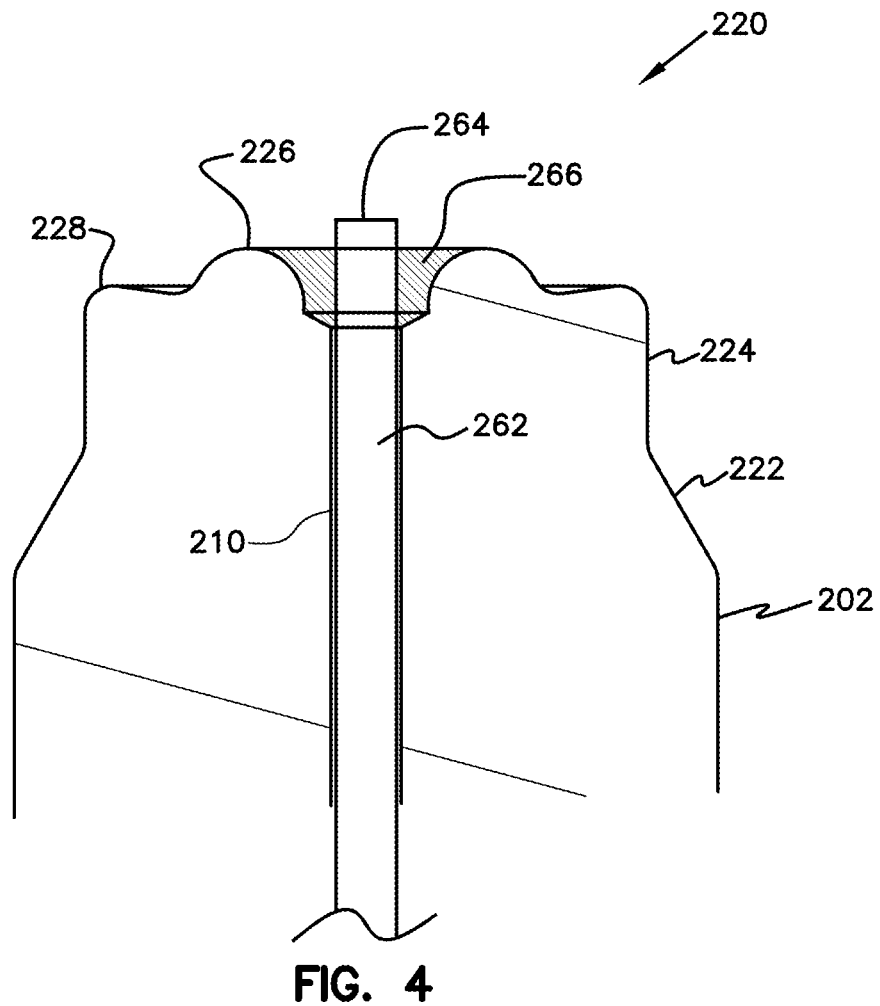
FIG. 4 is another enlarged view of a portion of the ferrule of FIG. 2.

As shown in FIGS. 3-4, the end face 220 of the ferrule 200 is configured to optimize the placement of the optical fiber 262 and polishing. Specifically, the main body 202 of the ferrule 200 has a diameter 218 of 1.25 mm. As the main body 202 extends towards the second end 206, the main body 202 tapers at region 222 so that the end face 220 has a diameter 233 of 1.0 mm.

This smaller surface area of the end face 200 can have advantages. For example, the smaller surface area results in less surface area contacting a mating ferrule, thereby minimizing the potential for surface abnormalities that might impact the connection. Further, the smaller surface area results in less area that must be polished, thereby optimizing the polishing (e.g., less material waste and faster polishing times).

Further, the end face 220 has a raised portion 226 that extends from an outer surface 228 of the end face 220. The raised portion 226 extends downward to a sloped chamfer surface 230. The sloped chamfer surface 230 terminates at a point 232 at the bore 210 of the ferrule 200.

The raised portion 226 allows the optical fiber to be terminated within the ferrule 200 more easily and accurately. Specifically, the optical fiber can be glued at the second end 206. Upon polishing, the raised portion 226 and the outer surface 228 can be removed, leaving the optical fiber within the bore 210. By controlling the position of the point 232 of the bore 210 relative to the diameter 218 of the ferrule 200, errors associated with offset of the position of the optical fiber 262 are minimized.

For example, in FIG. 4, an optical fiber 262 is placed through the bore 210, and an end 264 of the optical fiber 262 is exposed. An epoxy 266 is applied within the raised portion 226 to fix the optical fiber 262 in placed. Thereupon, the end 264 of the optical fiber 262 is cleaved, and the end face 220 of the ferrule 200 is polished. This configuration requires removal of approximately 0.141 to 0.149 mm of the end surface 220 during polishing, and it results in a removal of approximately 0.004 to 0.008 mm of the bore 210 after polishing is complete.

Referring now to FIGS. 6-7, the ferrule 200 is shown after polishing to form an Ultra Physical Contact (UPC) finish. As polished, the raised portion 226 and the outer surface 228 are removed, leaving a level end surface 252. In this example, approximately 0.140 mm of the second end 206 of the ferrule 200 is removed to a line 250. This line 250 generally coincides with the point 232 so the position of the bore 210 is optimized. Further, since the surface area of the end face 220 of the second end 206 is reduced due to the taper and specific features on the end face 220, the amount of material removed is smaller and polishing can be completed more quickly.

Referring now to FIGS. 8-9, the ferrule 200 is instead polished to have an Angled Physical Contact (APC) finish. In this example, the end surface 262 after polishing is angled, such as at an angle less than 0.5 degrees relative to the line 250, with one example being in the range of 0.1 to 0.2 degrees. Again, because of the geometry of the end face 220, the polishing is optimized, as well as the position of the bore 210.

Referring now to FIGS. 10-11, another example ferrule 300 is shown. The ferrule 300 is similar to the ferrule 200 described above. However, the ferrule 300 has a main body 302 with a diameter 332 of 2.5 mm. The ferrule 300 is configured to be used in an SC connector.

As the ferrule 300 extends to the second end 206, the main body 302 has tapered portions 304, 306 that reduce the diameter 332 of the ferrule 300 from 2.5 mm to a diameter 334 of 1.0 mm. With this reduction, the end face 220 of the ferrule 300 can be identical to that of the ferrule 200 described above. Such a configuration is advantageous in that molds and other technologies (e.g., cleaving and polishing) can be reused to reduce the costs associated with manufacturing ferrules of different sizes.

Referring to FIGS. 12-13, the ferrule 300 is shown with a UPC finish after polishing. Similarly, in FIGS. 14-15, the ferrule 300 is shown with an APC finish after polishing. Other configurations are possible.

Figure 17:
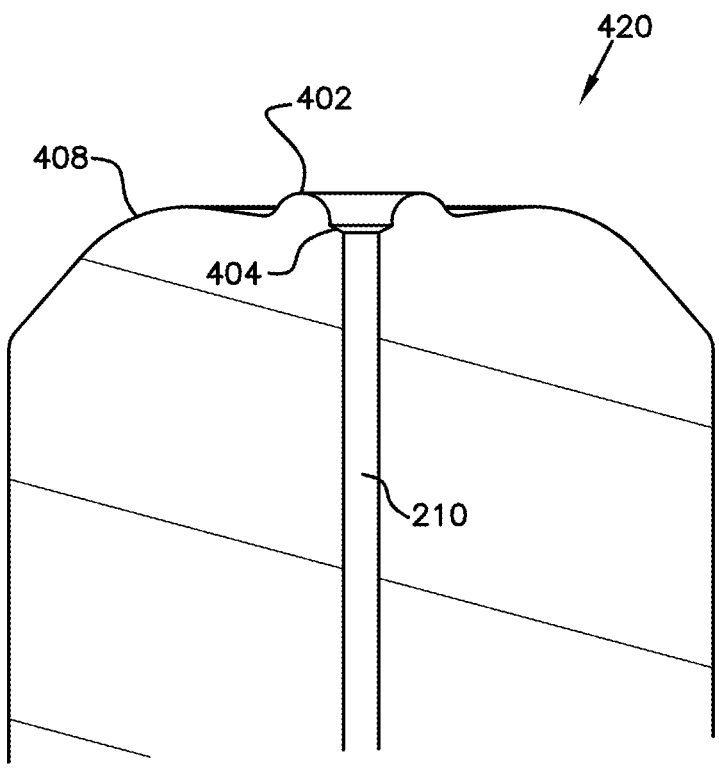
FIG. 17 is an enlarged view of a portion of the ferrule of FIG. 16.

Referring now to FIGS. 16-18, another example ferrule 400 is shown. This ferrule 400 includes an end face 420 of a different configuration.

The end face 420 includes a rounded end 408 that leads to a raised portion 402 surrounding the bore 210, along with a chamfer surface 404 extending from the raised portion 402 to the bore 210. These features again assist in providing uniformity of the epoxy that holds the optical fiber and helps to locate the bore relative to the diameter of the ferrule 400 after polishing. This configuration requires removal of approximately 0.176 to 0.186 mm of the end surface 420 during polishing, and it results in a removal of approximately 0.001 to 0.011 mm of the bore 210 after polishing is complete.

Referring to FIGS. 19-20, the ferrule 400 is shown with a UPC finish after polishing. Similarly, in FIGS. 21-22, the ferrule 400 is shown with an APC finish after polishing. Other configurations are possible.

Figure 24:
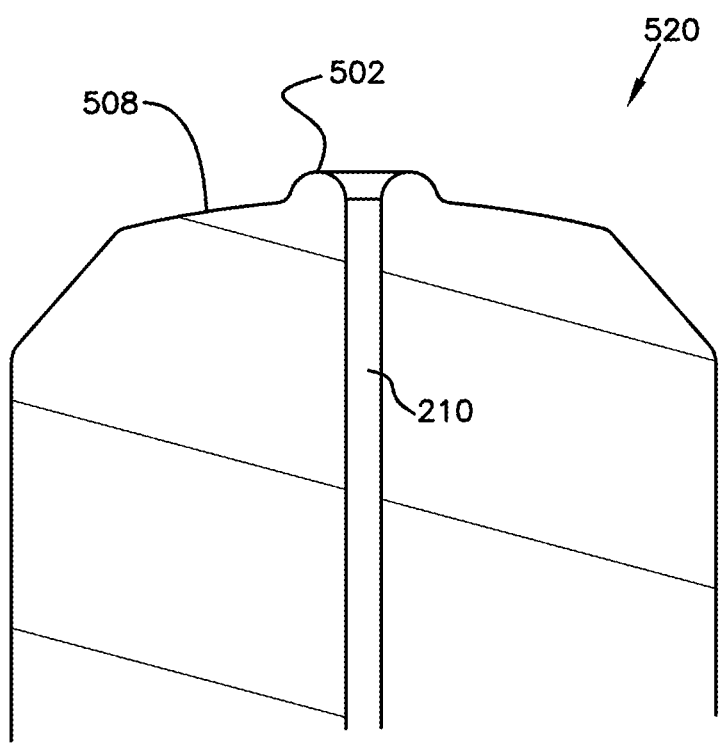
FIG. 24 is an enlarged view of a portion of the ferrule of FIG. 23.

Referring now to FIGS. 23-25, another example ferrule 500 is shown. This ferrule 500 includes an end face 520 of a different configuration.

The end face 520 includes a sloped surface 508 that leads to a raised portion 502 surrounding the bore 210. The raised portion 502 provides uniformity of the epoxy that holds the optical fiber within the ferrule 500. This configuration requires removal of approximately 0.150 to 0.180 mm of the end surface 520 during polishing, and it results in a removal of approximately 0.050 to 0.080 mm of the bore 210 after polishing is complete.

Referring to FIGS. 26-27, the ferrule 500 is shown with a UPC finish after polishing. Similarly, in FIGS. 28-29, the ferrule 500 is shown with an APC finish after polishing. Other configurations are possible.

In example embodiments, the ferrules described herein are made of ceramic. In such examples, the ceramic ferrules are molded using injection molding techniques such as those described in U.S. Pat. No. 5,781,674. In other examples, the ferrules can be made of other materials, such as polymers. In such examples, the ferrules can be manufactured using a molding process. In one example, the ferrule is made of Polyphenylene Sulfide (PPS) using an injection molding process. Other materials and molding processes can be used.

Although the examples shown herein illustrate SC and LC connectors, other connector types can be used. For example, in alternative embodiments, an LX.5 connector can be used, such as that illustrated in U.S. Pat. No. 6,629,782.

There can be various advantages associated with the ferrules disclosed herein. These advantages include one or more of reduced polishing times and consumables, better control of final concentricity of the fiber, and more controlled end surface geometry control.

For example, configuring ferrules having different diameters (e.g., 1.25 mm OD and 2.5 mm OD ferrules) to effectively have the same tip geometry prior to polishing minimizes process modifications. In such examples, two processes (APC and UPC) can be used for all connector designs (LC, SC, FC, ST, LX.5, etc.). In addition, the ability to use the same ferrule for both UPC and APC finishes lowers inventories, allows for higher turns, and lowers part costs from vendors.

In addition, the geometry of the ferrule end face, such as the raised portions, supports the fiber during cleaving to minimize the potential of the cleaved fiber to break within the bore of the ferrule. Further, the end face geometries enhance the ability to increase final radius on APC or UPC, if desired.

Finally, the reduced material removal for APC connectors means lower lapping film materials usage and shorter polishing times/higher productivity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A ferrule for a fiber optic connector, the ferrule comprising:
   a main body extending from a first end to a second end, the main body defining a bore having a bore diameter and extending from the first end to the second end;
   an end surface at the second end of the main body; and
   a raised portion on the end surface, the raised portion extending from the second end and surrounding the bore, and the raised portion forming a rounded surface;
   wherein the raised portion defines an opening along the rounded surface having a raised portion diameter that is greater than the bore diameter;
   wherein an optical fiber is configured to be positioned within the bore of the main body; and
   wherein the end surface is configured to be polished to remove the raised portion.

2. The ferrule of claim 1, further comprising a chamfer extending from the raised portion to the bore at the end surface.

3. The ferrule of claim 2, wherein the main body includes first and second portions, the first portion being of a first diameter, and the second portion being of a second diameter, the second diameter being smaller than the first diameter, and the second portion including the second end of the main body.

4. The ferrule of claim 3, wherein the ferrule is configured for use in an SC or LC connector.

5. The ferrule of claim 1, wherein the main body includes first and second portions, the first portion being of a first diameter, and the second portion being of a second diameter, the second diameter being smaller than the first diameter, and the second portion including the second end of the main body.

6. The ferrule of claim 1, wherein the ferrule is configured for use in an SC or LC connector.

7. A fiber optic connector, the connector comprising:
   a connector body; and
   a ferrule positioned with in the connector body, the ferrule including:
      a main body extending from a first end to a second end, the main body defining a bore having a bore diameter and extending from the first end to the second end;
      an end surface at the second end of the main body; and
      a raised portion on the end surface, the raised portion extending from the second end and surrounding the bore, and the raised portion forming a rounded surface;
      wherein the raised portion defines an opening along the rounded surface having a raised portion diameter that is greater than the bore diameter;
      wherein an optical fiber is configured to be positioned within the bore of the main body; and
      wherein the end surface is configured to be polished to remove the raised portion.

8. The connector of claim 7, further comprising a chamfer extending from the raised portion to the bore at the end surface.

9. The connector of claim 8, wherein the main body includes first and second portions, the first portion being of a first diameter, and the second portion being of a second diameter, the second diameter being smaller than the first diameter, and the second portion including the second end of the main body.

10. The connector of claim 9, wherein the connector is an SC or LC connector.

11. The connector of claim 7, wherein the main body includes first and second portions, the first portion being of a first diameter, and the second portion being of a second diameter, the second diameter being smaller than the first diameter, and the second portion including the second end of the main body.

12. The connector of claim 7, wherein the connector is an SC or LC connector.

13. A method for creating a fiber optic connector, the method comprising:
providing a ferrule having a main body extending from a first end to a second end, the main body defining a bore extending from the first end to the second end;
creating a raised portion having a rounded surface on an end surface of the second end of the main body, the raised portion extending from the second end and surrounding the bore and defining an opening having a diameter greater than a diameter of the bore;
positioning an optical fiber within the bore of the main body; and
polishing the end surface to remove the raised portion.

14. The method of claim 13, further comprising creating a chamfer extending from the raised portion to the bore at the end surface.

15. The method of claim 14, further comprising forming the main body of the ferrule into first and second portions, the first portion being of a first diameter, and the second portion being of a second diameter, the second diameter being smaller than the first diameter, and the second portion including the second end of the main body.

16. The method of claim 15, further comprising positioning the ferrule into a connector.

17. The method of claim 16, wherein the connector is an SC or LC connector.

18. The method of claim 13, further comprising forming the main body of the ferrule into first and second portions, the first portion being of a first diameter, and the second portion being of a second diameter, the second diameter being smaller than the first diameter, and the second portion including the second end of the main body.

19. The method of claim 13, further comprising positioning the ferrule into a connector.

20. The method of claim 19, wherein the connector is an SC or LC connector.

* * * * *